(12) United States Patent
Kuse et al.

(10) Patent No.: US 11,879,550 B2
(45) Date of Patent: Jan. 23, 2024

(54) SEAL AND ROTATING SYSTEM

(71) Applicant: STASSKOL GMBH, Stassfurt (DE)

(72) Inventors: Felix Kuse, Magdeburg (DE); Dennis Kranert, Aschersleben (DE)

(73) Assignee: STASSKOL GMBH, Stassfurt (DE)

( * ) Notice: Subject to any disclaimer, the term of this patent is extended or adjusted under 35 U.S.C. 154(b) by 92 days.

(21) Appl. No.: 17/532,252

(22) Filed: Nov. 22, 2021

(65) Prior Publication Data

US 2022/0170552 A1 Jun. 2, 2022

(30) Foreign Application Priority Data

Nov. 30, 2020 (DE) .......................... 102020215079.6

(51) Int. Cl.
*F16J 15/34* (2006.01)
(52) U.S. Cl.
CPC ................................. *F16J 15/3488* (2013.01)
(58) Field of Classification Search
CPC ...... F16J 15/34; F16J 15/3436; F16J 15/3452; F16J 15/3488; F16J 15/002
See application file for complete search history.

(56) References Cited

U.S. PATENT DOCUMENTS 2,912,265 A * 11/1959 Brummer ................. F16J 15/36
277/363
3,402,937 A 9/1968 Park et al.
4,580,793 A * 4/1986 Bronson .............. F16J 15/3488
29/516
6,305,693 B1 10/2001 Wehrle
7,040,627 B1 5/2006 Bartle
7,178,806 B1 2/2007 Pitchko et al.

FOREIGN PATENT DOCUMENTS

| CN | 105299234 A | 2/2016 |
| CN | 105971924 A | 9/2016 |
| DE | 699736 A | 12/1940 |
| DE | 1030642 B | 5/1958 |
| GB | 1314775 A | 4/1973 |

OTHER PUBLICATIONS

European Search Report dated Apr. 7, 2022 for copending Application No. EP212093561.
Official Action dated Sep. 19, 2023 for corresponding European application 21209356.1.

* cited by examiner

*Primary Examiner* — Gilbert Y Lee
(74) *Attorney, Agent, or Firm* — Hudak, Shunk & Farine Co. LPA

(57) ABSTRACT

A seal for a rotating system with two sealing units which are arranged one behind the other along a main axis H, the sealing units each having a through-hole for a shaft and being in interlocking engagement with each other in the circumferential direction and at least one axial compression spring element being arranged between the sealing units.

28 Claims, 7 Drawing Sheets

SEAL AND ROTATING SYSTEM

FIELD OF THE INVENTION

The present invention relates to a seal for a rotating system and to a rotating system with at least one seal.

BACKGROUND OF THE INVENTION

A rotating system is understood to mean an assembly in which at least one component rotates around an axis of rotation relative to another, stationary component. The rotating component is often a shaft.

Rotating systems are sealed to prevent media from escaping in an uncontrolled manner at the boundaries between rotating and stationary components. Seals are used to that end. Seals can be present either in the form of a single seal or as seal packings. A seal packing is made up of several individual seals (also called packing rings) arranged one behind the other in the axial direction.

From U.S. Pat. Nos. 7,040,627 B1 and 7,178,806 B1, two seals for rotating systems are known.

U.S. Pat. No. 6,305,693 B1 discloses a seal for a rotating system with a sealing ring which is arranged on a shaft and is pressed in the axial direction by compression springs against a sealing surface.

Additional seals are known from U.S. Pat. No. 3,402,937, DE 699 736 C, and CN 105971924 A.

SUMMARY OF THE INVENTION

The solutions known from the prior art are particularly unsatisfactory in terms of their long-term sealing effect. Therefore, the invention aimed to improve the sealing effect of seals for rotating systems.

The solution to this problem is a seal for a rotating system comprising two sealing units, which are arranged one behind the other along a main axis H, wherein the sealing units each have a through-hole for a shaft and are in interlocking engagement with each other in the circumferential direction and wherein at least one axial compression spring element is arranged between the sealing units.

The seal for a rotating system comprises two sealing units which are arranged one behind the other along a main axis H, wherein the sealing units each have a through-hole for a shaft and are in interlocking engagement with each other in the circumferential direction and wherein at least one axial compression spring element is arranged between the sealing units. The axial compression spring element does not have to be a separate component, but can also be integrally connected to one or both sealing units. The axial compression spring element causes the two sealing units to be pressed apart in opposite directions. In the case of an integral design, the compression spring element must therefore be arranged in such a way that it presses the two sealing units apart in the axial direction.

When used as intended, the seal is arranged on a shaft of a rotating system so that the shaft runs through the through-holes. The seal is non-positively connected to the shaft and rotates with the shaft. In the axial direction, the seal rests on a (static) surface relative to which the shaft rotates. The surface does not have to be globally static, but only relative to the shaft. In this manner, the seal seals in the axial direction dynamically next to the static surface and in the radial direction statically in relation to the shaft. It has been shown that the seal according to the invention performs better than previously known seals. The positive connection between the sealing units prevents torsion of the seal. There is a high degree of tightness even when the shaft moves radially. The compression spring elements also cause an axial adjustment in case of wear, whereby the tightness exists even over a long period of time.

The requirements for a static seal differ from those of a dynamic seal. At least one of the sealing units preferably has a first sealing ring and a second sealing ring, the sealing rings of a sealing unit being arranged axially adjacent. The first sealing ring then provides the static seal and the second sealing ring the dynamic seal. This means that both sealing rings can be optimized for the respective application. The first sealing ring is preferably rich in friction and the second sealing ring is preferably low in friction. The first sealing ring then fixes the seal on the shaft and the second sealing ring can rotate relative to the static surface without great frictional forces counteracting the movement. The first sealing ring is particularly preferably made of an elastomer. As a result, the first sealing ring compensates for radial and axial displacement in the seal. The second sealing ring is preferably made of PTFE or a PTFE compound.

The sealing rings preferably each have a through-hole which together form the through-hole for the shaft.

The sealing rings of a sealing unit are preferably in positive engagement with one another in the circumferential direction. As a result, the second sealing ring can be fixed relative to the shaft by the first. The second sealing ring does not have to be in direct contact with the shaft. However, there is preferably a gap between the shaft and the second sealing ring in order to allow an angular displacement between the shaft and the second sealing ring.

In particular, the second sealing ring preferably has a recess in the axial direction and the first sealing ring has a complementary projection to the recess in the axial direction, wherein the recess and the projection connect the sealing rings to one another in a form-fitting manner. When assembling the seal, the sealing rings then only have to be pushed onto the shaft one after the other, whereby the projection penetrates into the recess and the sealing rings are positively connected to each other. The recess and the projection are preferably arranged centrally, more preferably rotationally symmetrical about the main axis H.

The recess and the projection preferably each have the shape of a Reuleaux triangle in the cross-section, more preferably one with rounded corners. The formation of the elements as a Reuleaux triangle leads to good power transmission. The rounding of the corners minimizes the notch effect and compensates for any manufacturing tolerances of the first sealing ring, which makes its assembly easier.

To further improve the sealing performance, the sealing units are preferably structurally identical, but arranged in a mirrored fashion. In addition to being mirrored, the sealing units can be rotated with respect to one another. The reflection takes place on a plane that runs perpendicular to the main axis H. The mirrored arrangement enables the arrangement of the seal between two static surfaces, the second sealing rings each resting on one of the surfaces and sealing there.

The first sealing ring preferably has at least one depression on an axial end face and an elevation located behind it in the circumferential direction, in particular immediately behind it. The number n of recesses and protrusions and their arrangement in the circumferential direction are preferably selected such that each recess can be assigned a protrusion offset by 180°/n in the circumferential direction. If two identical sealing units are arranged in a mirrored fashion with protrusions and recesses, their axial end faces are arranged facing each other in such a way that each protrusion of the first sealing ring lies in the recess of the other first sealing ring. A mirrored arrangement also includes arrangements in which the sealing units are additionally rotated relative to one another about the main axis H so that the protrusions and recesses of the first sealing rings interlock. Relative movements between the sealing units in the circumferential direction are prevented in this way, since the flanks of the recesses and protrusions rest against one another. This prevents torsion of the seal. It is particularly preferable to provide several recesses and protrusions per first sealing ring, in particular two each, which are arranged alternately one behind the other in the circumferential direction.

The compression spring elements are preferably spiral springs. The first sealing ring preferably has at least one axial blind hole, wherein the axial compression spring element is arranged in the axial blind hole. The blind holes guide the compression spring elements, especially when they are spiral springs, and enable the compression spring elements to be positioned in a defined manner on the first sealing ring. A plurality of compression spring elements are preferably provided, in particular four compression spring elements, and a separate blind hole is preferably provided for each compression spring element. If two identical sealing units are arranged in a mirrored fashion, each compression spring element is arranged in a blind hole of the first sealing ring of the one sealing unit and additionally in a blind hole of the first sealing ring of the other sealing unit and is guided by both blind holes.

The first sealing ring is preferably in one piece. One-piece production is inexpensive and simplifies assembly. However, the first sealing ring is preferably interrupted in the circumferential direction and has two ends, with a connecting means being provided at each end for jointly closing the sealing ring in the circumferential direction. This way the assembly of the first sealing ring on the shaft will be simplified because the first sealing ring can also be slipped around the shaft from a radial direction. This applies in particular when the first sealing ring is made from an elastomer. The connecting means preferably interlock with one another in the circumferential direction, in particular in the form of a puzzle connection, whereby a secure hold of the seal on the shaft is guaranteed.

The second sealing ring is preferably divided in the circumferential direction into at least two segments that can be connected to one another, particularly preferably into two segments. In particular, if the second sealing ring is made of a wear-resistant plastic (such as a PTFE compound), the second sealing ring cannot be mounted on the shaft from the radial direction like the first sealing ring due to its rigidity. The subdivision into several segments, however, enables such an assembly. Adjacent segments can preferably be connected to one another in a form-fitting manner, in particular by means of a puzzle connection.

The rotating system according to the invention comprises a shaft rotating about a main axis H, at least one surface that is static relative to the shaft, and one seal that is arranged on the shaft and in contact with the surface as described above. The seal is arranged on the shaft in such a way that the shaft runs through the through-holes of the seal. The seal is non-positively connected to the shaft and rotates with the shaft. In the axial direction, the seal rests on a (static) surface, relative to which the shaft rotates. The surface does not have to be globally static, but only relative to the shaft. In this way, the seal seals dynamically on the static surface in the axial direction and also statically on the shaft in the radial direction. It has been shown that the seal according to the invention performs better than previously known seals. The positive connection between the sealing units prevents torsion of the seal.

There is a high degree of tightness even when the shaft moves radially. The compression spring elements also provide axial readjustment in the event of wear, which means that the seal remains tight over a long period of time. The static surface preferably runs perpendicular to the main axis H.

The rotating system preferably comprises two static surfaces, each surface being in contact with precisely one of the sealing units. The seal is then placed between the surfaces. The seal is particularly preferably arranged in a housing, the housing having two static surfaces with which the seal is in contact.

The housing preferably has at least one gas supply opening. When used as intended, a flushing or sealing gas is introduced through the gas supply opening under pressure. The gas pressure increases the sealing effect of the second sealing rings on the static surfaces, supports the readjustment behavior of the first sealing rings and thus also contributes to the fact that the medium to be sealed does not escape. The gas pressure is preferably 0.1 to 0.5 bar above ambient pressure.

The rotating system is preferably used for slowly rotating applications, for example in mixers for powder, dust and food as well as in agitators. Slowly rotating applications are understood to mean, in particular, those with sliding speeds of up to 1.5 m/s.

BRIEF DESCRIPTION OF THE DRAWINGS

The invention is illustrated and explained in the following by way of example with reference to the drawings. The figures show the following:

FIG. 1b shows a further partial section of the rotating system according to FIG. 1a;

FIG. 2a shows a first perspective view of a first sealing ring of the rotating system according to FIG. 1a;

FIG. 2b shows a second perspective view of a first sealing ring of the rotating system according to FIG. 1a;

FIG. 2c shows the entirety of two first sealing rings of the rotating system according to FIG. 1a;

FIG. 3a shows a perspective view of a second sealing ring of the rotating system according to FIG. 1a;

FIG. 3b shows a plan view of a second sealing ring of the rotating system according to FIG. 1a;

DETAILED DESCRIPTION OF THE INVENTION

Figure 1A:
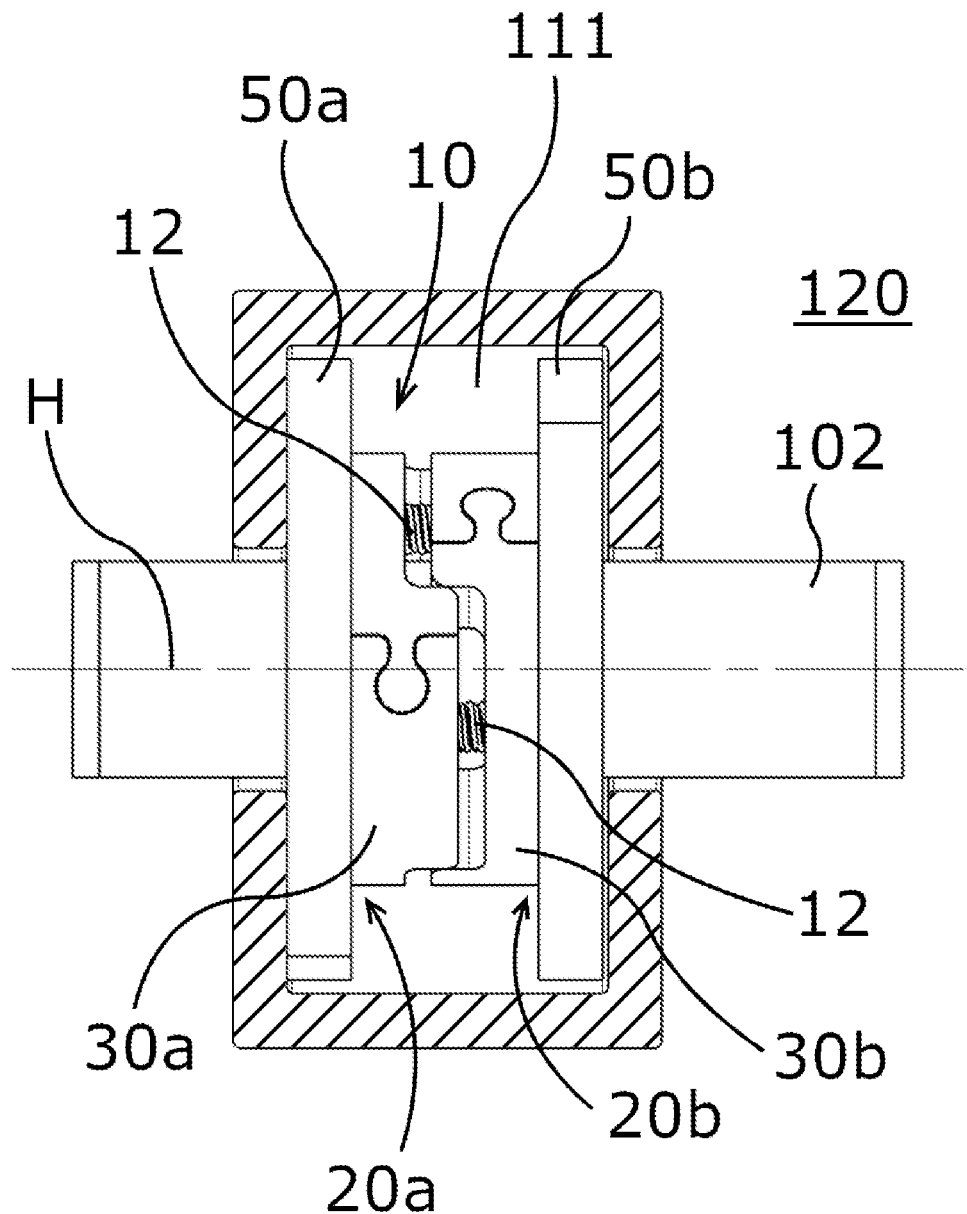
FIG. 1a shows a partial section of a rotating system.
Figure 1B:
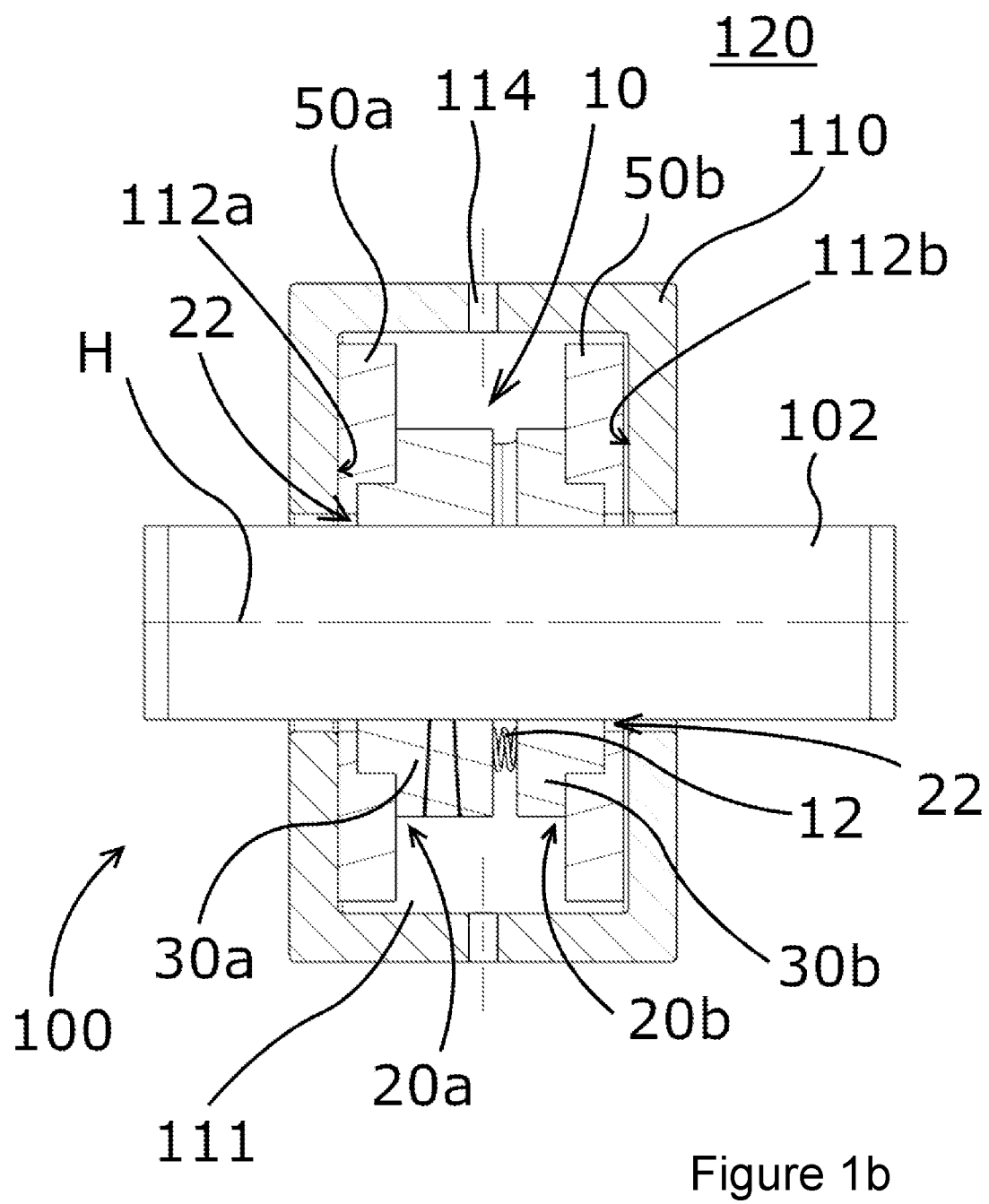

The rotating system 100 shown in FIG. 1a, 1b comprises a shaft 102 rotating about a main axis H and a seal 10 arranged on the shaft 102 (see FIG. 1a). The seal 10 is arranged in a housing 110. When used as intended, the housing 110 does not rotate with the shaft 102. Rather, the housing 110 is static and includes two static surfaces 112a, 112b, which each run perpendicular to the main axis H (see FIG. 1b). The seal 10 is arranged between the surfaces 112a, 112b and remains in contact in the axial direction with both static surfaces 112a, 112b.

The seal 10 comprises two sealing units 20a, 20b, which are arranged one behind the other along the main axis H. Each sealing unit 20a, 20b comprises a through-hole 22, the shaft 102 running through the through-holes 22. The sealing units 20a, 20b are structurally identical, but mirrored and rotated relative to one another on the shaft 102.

The sealing units 20a, 20b each include a first sealing ring 30a, 30b 5 and a second sealing ring 50a, 50b.

Figure 2A:
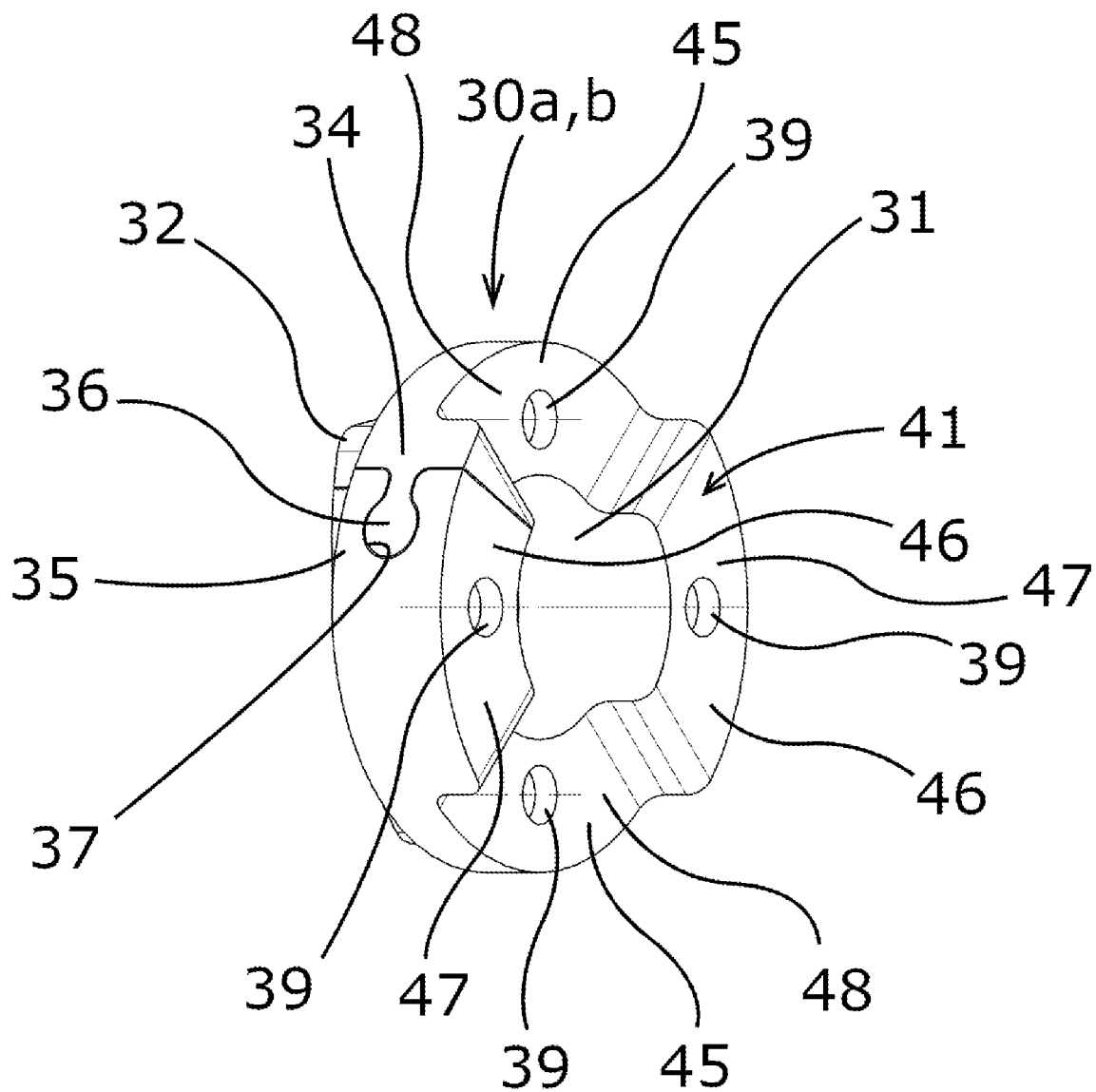
Figure 2B:
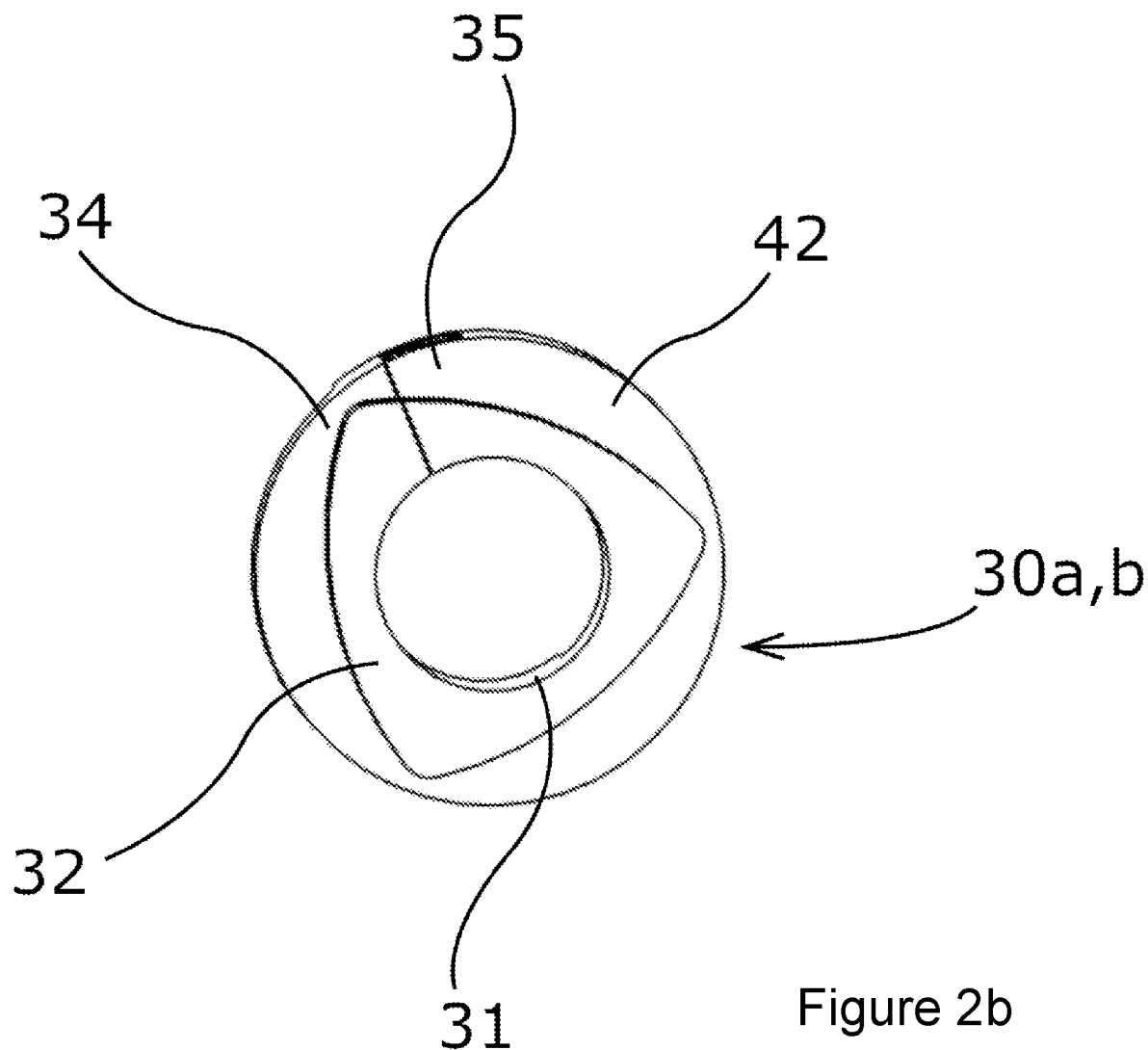

The first sealing rings 30a, 30b shown in FIGS. 2a, 2b each have two axial end faces 41, 42 and an axial through-hole 31. On the first end face 41, two recesses 45 and two protrusions 46 are arranged (see FIG. 2a). The recesses 45 and protrusions 46 alternate in the circumferential direction and merge into one another. Each recess 45 and each protrusion 46 forms a plateau 47, 48. In total, there are four plateaus 47, 48. An axial blind hole 39 is arranged in the area of each plateau. The blind holes 39 extend parallel to the through-hole 31.

The first sealing rings 30a, 30b consist of an elastomer and are in one piece. However, the first sealing rings 30a, 30b are each interrupted in the circumferential direction and have two ends 34, 35. At each of the ends 34, 35, a connecting means 36, 37 is provided. The connecting means 36, 37 form a puzzle connection and, when used as intended, engage with one another in a form-fitting manner in the circumferential direction, as a result of which they close the respective sealing ring 30a, 30b in the circumferential direction by means of a form-fit connection.

The first sealing rings 30a, 30b each have a projection 32 on the second end face 42 (see FIG. 2b). The projection 32 is arranged centrally on the second end face 42 and has the shape of a Reuleaux triangle with rounded corners in cross section.

Figure 2C:
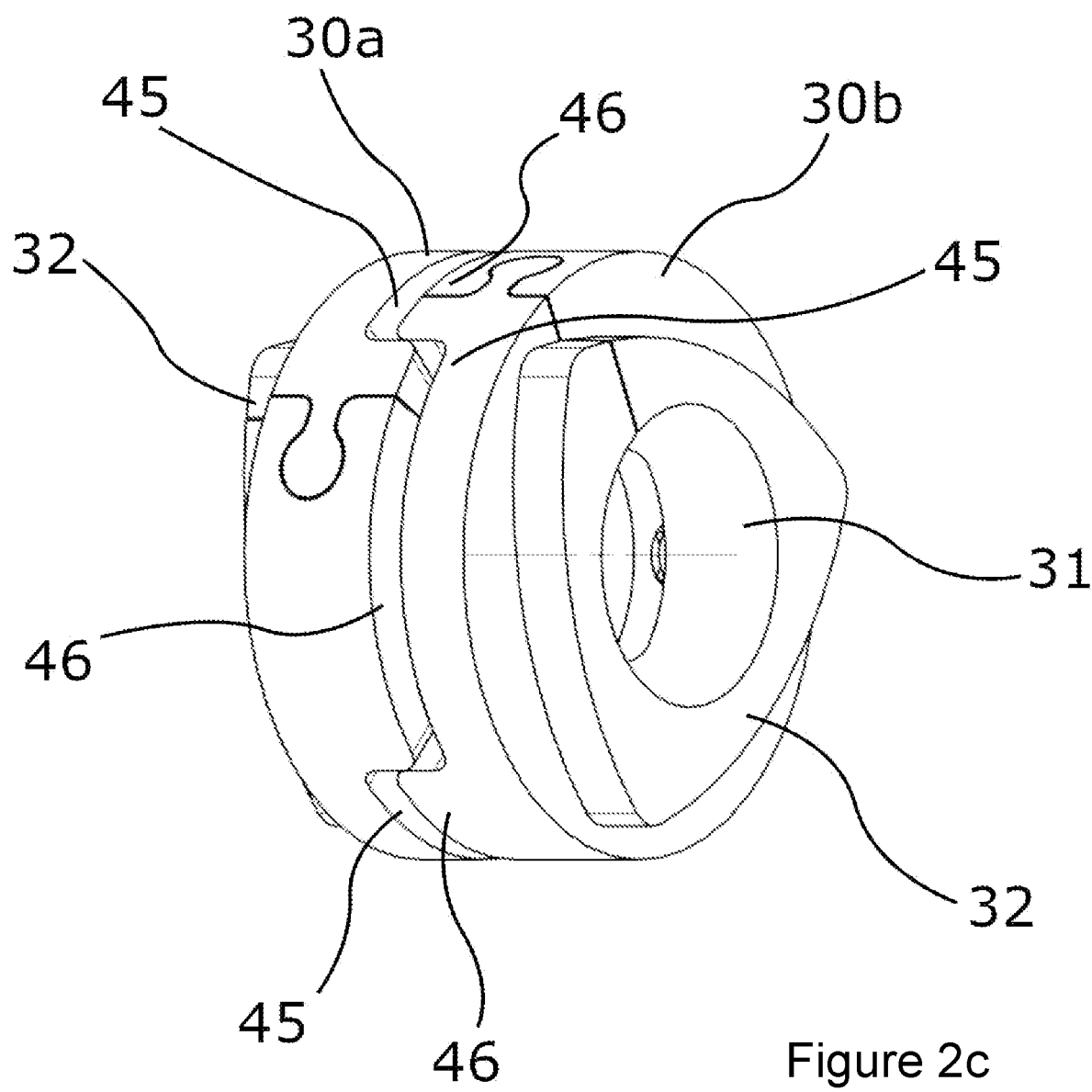

The structurally identical sealing units 20a, 20b are, as mentioned, mirrored and arranged rotated with respect to one another. In this way, the axial first end surfaces 41 of the first sealing rings 30a, 30b face one another in such a way that the protrusions 46 of the first sealing rings 30a, 30b each lie in the recesses 45 of the other first sealing ring 30a, 30b. As a result, the first sealing rings 30a, 30b are positively engaged with one another (see FIG. 2c). Consequently, the sealing units 20a, 20b as a whole are also in positive engagement with one another in the circumferential direction (see FIG. 1a).

Figure 3A:
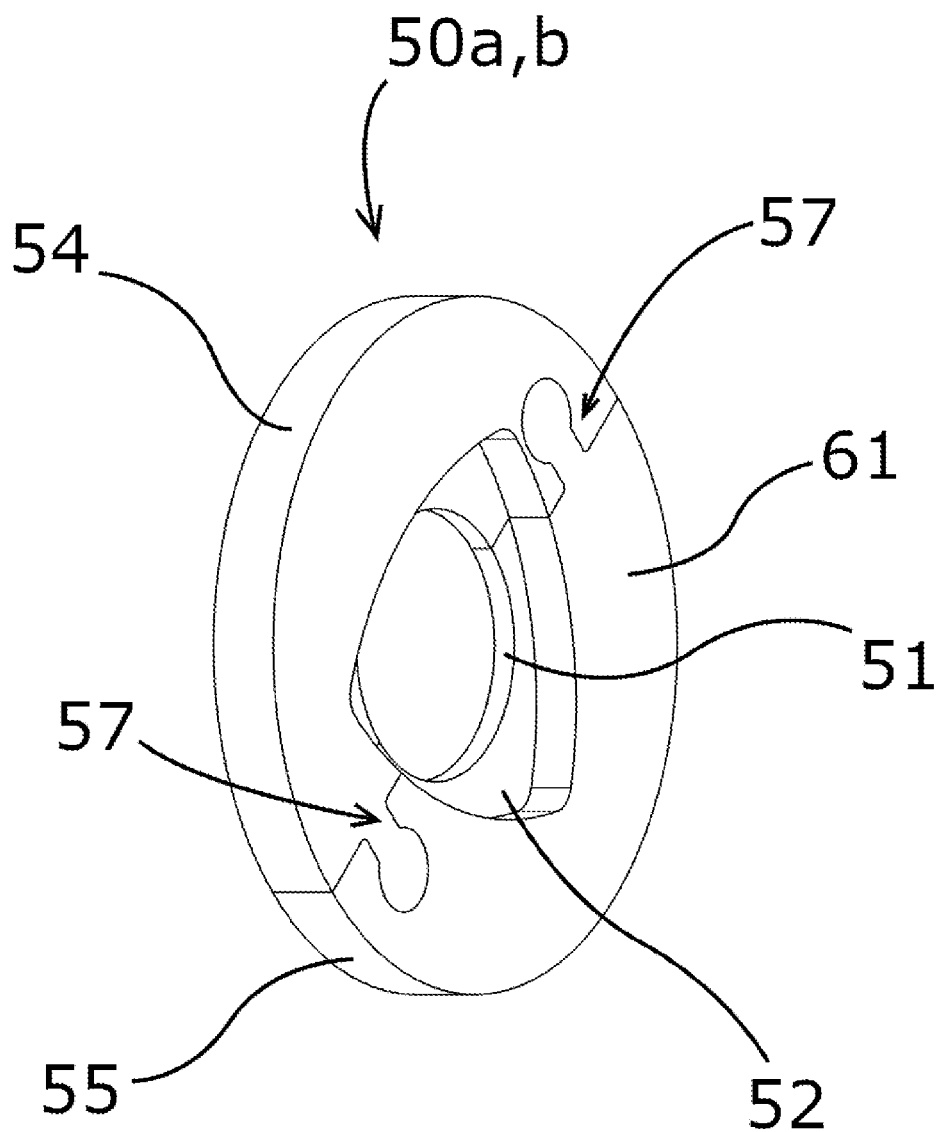
Figure 3B:
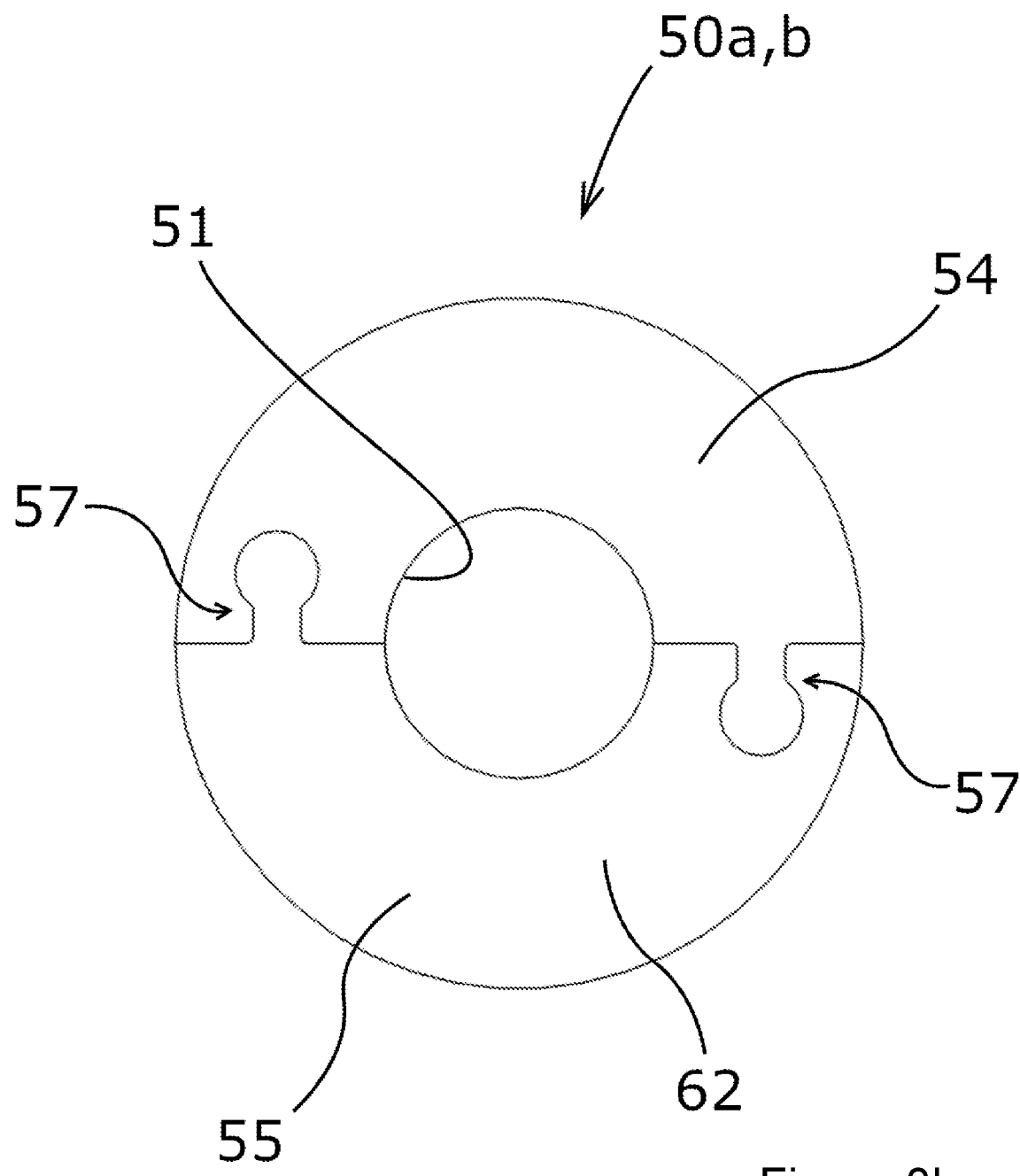

The second sealing rings 50a, 50b shown in FIGS. 3a, 3b consist of a PTFE compound. In other embodiments, the sealing rings 50a, 50b can consist of other wear-resistant plastics. In this way, the second sealing rings 50a, 50b have lower friction than the first sealing rings 30a, 30b.

The second sealing rings 50a, 50b each have a through-hole 51 which, together with the through-hole 31 of the associated first sealing ring 30a, 30b, form the through-hole 22 for the shaft 102 (see FIG. 1a).

The second sealing rings 50a, 50b are each subdivided in the circumferential direction into at least two segments 54, 55 that can be connected to one another (see FIG. 3a). The segments 54, 55 each have complementary connecting means of two puzzle connections 57 and can be connected to one another in this way.

The second sealing rings 50a, 50b have a recess 52 on an axial first end face 61. The recess 52 is arranged centrally on the end face 61 and has the shape of a Reuleaux triangle with rounded corners in cross section. The recess 52 is complementary to the projection 32 of the associated first sealing ring 30a, 30b. When used as intended, the projection 32 sits in the recess 52, whereby the sealing rings 30a, 50a of the sealing unit 20a and the sealing rings 30b, 50b of the sealing unit 20b are each in positive engagement with one another in the circumferential direction.

The second axial end face 62 of the second sealing rings 50a, 50b acts, when used as intended, as a sliding surface opposite the static surface 112a, 112b.

A plurality of axial compression spring elements 12 are arranged between the sealing units 20a, 20b (see FIG. 1a). The compression spring elements 12 are arranged in the blind holes 39 of the first sealing rings 30a, 30b and have the effect that the sealing units 20a, 20b are pretensioned against one another in the axial direction, that is to say are pressed apart in opposite axial directions. In this way, the second axial end faces 62 of the second sealing rings 50a, 50b, when used as intended, are pressed against the static surfaces 112a, 112b of the housing 110 and there seal an interior 111 of the housing 110 relative to the environment 120. In this way, the entry of gas from the environment 120 into the interior 111 of the housing 110 is prevented or reduced. The second sealing rings 50a, 50b continue to be pressed against the static surfaces 112a, 112b even when wear occurs, so that the sealing effect is also ensured in the long term.

The housing 110 comprises two gas supply openings 114, each in the form of a through-hole (see FIG. 1b). A flushing or sealing gas (such as nitrogen) can be introduced through the gas supply openings 114 when used as intended. The pressure of the sealing gas is higher than the pressure in the environment 120. The sealing gas increases the pretension between the sealing units 20a, 20b. At the same time, the higher pressure means that in the event of a leak in the area of the seal, sealing gas is released into the environment 120. This also prevents or reduces the entry of gas from the environment 120 into the interior 111 of the housing 110.

Overall, the seal 10 is thus held securely on the shaft 102 by the first sealing rings 30a, 30b due to their high friction. The interlocking connection of the first sealing rings 30a, 30b with one another leads to the blind holes 39 being aligned with one another. The compression spring elements 12 bring about an axial prestress between the sealing units 20a, 20b. The prestress is increased by the sealing gas. The second sealing rings 50a, 50b, due to their form-fitting connection, are moved as well by the first sealing rings 30a, 30b and form a seal against the static surfaces 112a, 112b. Since the friction between the shaft 102 and the first sealing rings 30a, 30b is greater than the friction between the second sealing rings 50a, 50b and the static surfaces 112a, 112b, it is ensured that the seal 10 rotates with the shaft 102.

LIST OF REFERENCE SYMBOLS 10 seal
12 compression spring element
20a sealing unit
20b sealing unit
22 through-hole
30a first sealing ring
30b first sealing ring
31 through-hole
32 projection
34 end
35 end
36 connecting means
37 connecting means
39 blind hole
41 first end face
42 second end face
45 recess
46 protrusion
47 plateau
48 plateau 50a second sealing ring
50b second sealing ring
51 through-hole
52 recess
54 segment
55 segment
57 puzzle connection
61 first end face
62 second end face
100 rotating system
102 wave
110 housing
111 interior
112a surface
112b surface
114 gas supply opening
120 environment
H main axis

What is claimed is:

1. A seal for a rotating system, comprising:
   two sealing units, which are arranged one behind the other along a main axis H, wherein the sealing units each have a through-hole for a shaft and are in interlocking engagement with each other in the circumferential direction,
   wherein at least one axial compression spring element is arranged between the sealing units,
   wherein at least one of the sealing units has a first sealing ring and a second sealing ring, the sealing rings of one single sealing unit being arranged axially adjacent to each other, and
   wherein the sealing rings of a sealing unit are in interlocking engagement with each other in the circumferential direction.

2. The seal according to claim 1, wherein the first sealing ring is high in friction and the second sealing ring is low in friction.

3. The seal according to claim 2, wherein the sealing rings each have a through-hole, which together form the through-hole for the shaft, wherein the second sealing ring has a recess in the axial direction and the first sealing ring has a projection in the axial direction that is complementary to the recess, wherein the recess and the projection connect the sealing rings in interlocking engagement with each other, wherein the recess and the projection each have the shape of a Reuleaux triangle in cross-section, and wherein the sealing units are structurally identical but arranged in a mirrored fashion.

4. The seal according to claim 3, wherein the first sealing ring on an axial end face has at least one recess and one protrusion lying behind the recess in the circumferential direction, wherein the first sealing ring has at least one axial blind hole, the axial pressure spring element being arranged in the axial blind hole, wherein the first sealing ring is in one piece, wherein the first sealing ring is interrupted in the circumferential direction and has two ends, wherein at each end a connecting means for joint closing of the sealing ring in the circumferential direction is provided, wherein the connecting means interlocks positively in the circumferential direction, wherein the second sealing ring is subdivided into at least two interconnectable segments in the circumferential direction, and wherein adjacent segments can be connected in interlocking engagement with each other.

5. The seal according to claim 1, wherein the sealing rings each have a through-hole, which together form the through-hole for the shaft.

6. The seal according to claim 1, wherein the second sealing ring has a recess in the axial direction and the first sealing ring has a projection in the axial direction that is complementary to the recess, wherein the recess and the projection connect the sealing rings in interlocking engagement with each other.

7. The seal according to claim 6, wherein the recess and the projection each have the shape of a Reuleaux triangle in cross-section.

8. The seal according to claim 1, wherein the sealing units are structurally identical but arranged in a mirrored fashion.

9. The seal according to claim 1, wherein the first sealing ring on an axial end face has at least one recess and one protrusion lying behind the recess in the circumferential direction.

10. The seal according to claim 1, wherein the first sealing ring has at least ne axial blind hole, the axial pressure spring element being arranged in the axial blind hole.

11. The seal according to claim 1, wherein the first sealing ring is in one piece.

12. The seal according to claim 1, wherein the first sealing ring is interrupted in the circumferential direction and has two ends, wherein at each end a connecting means for joint closing of the sealing ring in the circumferential direction is provided.

13. The seal according to claim 12, wherein the connecting means interlocks positively in the circumferential direction.

14. The seal according to claim 1, wherein the second sealing ring is subdivided into at least two interconnectable segments in the circumferential direction.

15. The seal according to claim 14, wherein adjacent segments can be connected in interlocking engagement with each other.

16. A rotating system with
    one shaft, at least
    one surface, and
    one seal according to claim 1,
    wherein the shaft is rotatable about a main axis H, the surface is static to the shaft, and the seal is arranged on the shaft and remains in contact with the surface.

17. The rotating system according to claim 16, wherein the seal is arranged in a housing, wherein the housing has two static surfaces with which the seal is in contact.

18. The rotating system according to claim 16, wherein the housing has a gas supply opening.

19. A seal for a rotating system, comprising:
    two sealing units, which are arranged one behind the other along a main axis H, wherein the sealing units each have a through-hole for a shaft and are in interlocking engagement with each other in the circumferential direction,
    wherein at least one axial compression spring element is arranged between the sealing units,
    wherein at least one of the sealing units has a first sealing ring and a second sealing ring, the sealing rings of one single sealing unit being arranged axially adjacent to each other, and
    wherein the second sealing ring has a recess in the axial direction and the first sealing ring has a projection in the axial direction that is complementary to the recess, wherein the recess and the projection connect the sealing rings in interlocking engagement with each other.

20. The seal according to claim 19, wherein the recess and the projection each have the shape of a Reuleaux triangle in cross-section.

21. The seal according to claim 19, wherein the first sealing ring is high in friction and the second sealing ring is low in friction; or wherein the sealing rings each have a through-hole, which together form the through-hole for the shaft; or wherein the sealing rings of a sealing unit are in interlocking engagement with each other in the circumferential direction; or wherein the sealing units are structurally identical but arranged in a mirrored fashion; or wherein the first sealing ring on an axial end face has at least one recess and one protrusion lying behind the recess in the circumferential direction; or wherein the first sealing ring has at least one axial blind hole, the axial pressure spring element being arranged in the axial blind hole; or wherein the first sealing ring is in one piece; or wherein the first sealing ring is interrupted in the circumferential direction and has two ends, wherein at each end a connecting means for joint closing of the sealing ring in the circumferential direction is provided, wherein the connecting means interlocks positively in the circumferential direction; or wherein the second sealing ring is subdivided into at least two interconnectable segments in the circumferential direction, wherein adjacent segments can be connected in interlocking engagement with each other.

22. A rotating system with
one shaft,
at least one surface, and
one seal according to claim 19,
wherein the shaft is rotatable about a main axis H, the surface is static to the shaft, and the seal is arranged on the shaft and remains in contact with the surface.

23. The rotating system according to claim 22, wherein the seal is arranged in a housing, wherein the housing has two static surfaces with which the seal is in contact, and wherein the housing has a gas supply opening.

24. A seal for a rotating system, comprising:
two sealing units, which are arranged one behind the other along a main axis H, wherein the sealing units each have a through-hole for a shaft and are in interlocking engagement with each other in the circumferential direction,
wherein at least one axial compression spring element is arranged between the sealing units,
wherein at least one of the sealing units has a first sealing ring and a second sealing ring, the sealing rings of one single sealing unit being arranged axially adjacent to each other, and
wherein the second sealing ring is subdivided into at least two interconnectable segments in the circumferential direction.

25. The seal according to claim 24, wherein adjacent segments can be connected in interlocking engagement with each other.

26. The seal according to claim 24, wherein the first sealing ring is high in friction and the second sealing ring is low in friction; or wherein the sealing rings each have a through-hole, which together form the through-hole for the shaft; or wherein the sealing rings of a sealing unit are in interlocking engagement with each other in the circumferential direction; or wherein the second sealing ring has a recess in the axial direction and the first sealing ring has a projection in the axial direction that is complementary to the recess, wherein the recess and the projection connect the sealing rings in interlocking engagement with each other, wherein the recess and the projection each have the shape of a Reuleaux triangle in cross-section; or wherein the sealing units are structurally identical but arranged in a mirrored fashion; or wherein the first sealing ring on an axial end face has at least one recess and one protrusion lying behind the recess in the circumferential direction; or wherein the first sealing ring has at least one axial blind hole, the axial pressure spring element being arranged in the axial blind hole; or wherein the first sealing ring is in one piece; or wherein the first sealing ring is interrupted in the circumferential direction and has two ends, wherein at each end a connecting means for joint closing of the sealing ring in the circumferential direction is provided; or wherein the connecting means interlocks positively in the circumferential direction.

27. A rotating system with
one shaft,
at least one surface, and
ne seal according to claim 24,
wherein the shaft is rotatable about a main axis H, the surface is static to the shaft, and the seal is arranged on the shaft and remains in contact with the surface.

28. The rotating system according to claim 27, wherein the seal is arranged in a housing, wherein the housing has two static surfaces with which the seal is in contact, and wherein the housing has a gas supply opening.

* * * * *